United States Patent
Hwang et al.

(10) Patent No.: US 12,320,538 B2
(45) Date of Patent: Jun. 3, 2025

(54) AIR CONDITIONER AND METHOD FOR CONTROLLING SAME

(71) Applicant: Samsung Electronics Co., Ltd., Suwon-si (KR)

(72) Inventors: Jun Hwang, Suwon-si (KR); Taewoo Kim, Suwon-si (KR); Sangwoo Lee, Suwon-si (KR); Seungjun Park, Suwon-si (KR); Hyeongkyu Cho, Suwon-si (KR); Youngju Joo, Suwon-si (KR); Hyeongjoon Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 959 days.

(21) Appl. No.: 17/309,071

(22) PCT Filed: Nov. 19, 2019

(86) PCT No.: PCT/KR2019/015814
§ 371 (c)(1),
(2) Date: Apr. 20, 2021

(87) PCT Pub. No.: WO2020/106003
PCT Pub. Date: May 28, 2020

(65) Prior Publication Data
US 2022/0018569 A1   Jan. 20, 2022

(30) Foreign Application Priority Data
Nov. 23, 2018   (KR) .................. 10-2018-0146133

(51) Int. Cl.
*F24F 11/77* (2018.01)
*F24F 1/0033* (2019.01)
(Continued)

(52) U.S. Cl.
CPC ............. *F24F 11/77* (2018.01); *F24F 1/0033* (2013.01); *F24F 1/005* (2019.02); *F24F 2110/10* (2018.01)

(58) Field of Classification Search
CPC .......... F24F 11/77; F24F 1/0033; F24F 1/005; F24F 2110/10; F24F 1/0035
(Continued)

(56) References Cited

U.S. PATENT DOCUMENTS 5,467,606 A * 11/1995 Sasaki .................. F24F 1/0033
236/38
6,295,823 B1 * 10/2001 Odom .................. F24F 1/0063
236/1 R
(Continued)

FOREIGN PATENT DOCUMENTS

CN      107477675 A  * 12/2017
DE   202006003069 U1 *  6/2006  ............ F24F 1/0007
(Continued)

OTHER PUBLICATIONS

Office Action dated Feb. 22, 2023, in connection with Korean Application No. 10-2018-0146133, 10 pages.
(Continued)

*Primary Examiner* — Edelmira Bosques
*Assistant Examiner* — Frances F. Hamilton

(57) ABSTRACT

An air conditioner is provided. The air conditioner includes a housing with separate channels, a heat exchanger, two fans, a driver, and a controller. The heat exchanger exchanges heat with air in one channel, while the two fans expel air from separate channels. The driver operates the fans, and the controller regulates their operation based on indoor and outdoor temperatures, selectively activating a second fan of the two fans according to preset temperature conditions.

8 Claims, 12 Drawing Sheets

(51) Int. Cl.
*F24F 1/005* (2019.01)
*F24F 110/10* (2018.01)

(58) Field of Classification Search
USPC .......................................................... 454/229
See application file for complete search history.

(56) References Cited

U.S. PATENT DOCUMENTS

| | | | | |
|---|---|---|---|---|
| 9,021,822 | B2* | 5/2015 | Unagida | F24F 11/77 |
| | | | | 62/177 |
| 9,726,384 | B2* | 8/2017 | Taira | F24F 11/79 |
| 9,863,661 | B2* | 1/2018 | Iwano | F24F 11/79 |
| 9,964,324 | B2* | 5/2018 | Taira | F24F 11/77 |
| 9,982,902 | B2* | 5/2018 | Hayashi | F24F 1/0011 |
| 2012/0190292 | A1* | 7/2012 | Skrepcinski | F24F 7/003 |
| | | | | 454/258 |
| 2013/0284410 | A1* | 10/2013 | Taira | F24F 11/79 |
| | | | | 165/121 |
| 2014/0000852 | A1* | 1/2014 | Kim | F24F 1/005 |
| | | | | 454/284 |
| 2015/0176909 | A1* | 6/2015 | Josserand | F24F 7/10 |
| | | | | 165/121 |
| 2016/0327297 | A1* | 11/2016 | Song | F24F 13/222 |

FOREIGN PATENT DOCUMENTS

| | | | |
|---|---|---|---|
| JP | 2003130381 A | * | 5/2003 |
| JP | 2012-093043 A | | 5/2012 |
| JP | 2013-096633 A | | 5/2013 |
| JP | H05733951 B9 | | 6/2015 |
| JP | 2016-099032 A | | 5/2016 |
| KR | 10-2000-0008790 A | | 2/2000 |
| KR | 10-2003-0060005 A | | 7/2003 |
| KR | 10-2011-0012358 A | | 2/2011 |
| KR | 10-2011-0049939 A | | 5/2011 |
| KR | 10-1560824 B1 | | 10/2015 |
| KR | 10-2016-0051095 A | | 5/2016 |
| KR | 10-1672211 B1 | | 11/2016 |
| KR | 10-2017-0009701 A | | 1/2017 |
| KR | 10-2017-0011942 A | | 2/2017 |
| KR | 10-2017-0039104 A | | 4/2017 |
| KR | 10-1791056 B1 | | 10/2017 |
| WO | WO-2006018675 A1 | * | 2/2006 ............ F24F 1/0007 |

OTHER PUBLICATIONS

International Search Report and Written Opinion of the International Searching authority in connection with International Application No. PCT/KR2019/015814 issued Mar. 19, 2020, 10 pages.

* cited by examiner

FIG. 10

| | SECTION | RPM OF MAIN FAN | RPM OF SUB FAN |
|---|---|---|---|
| HIGH LOAD CONDITION | SECTION A | 1180/1080/980 | 1200 |
| | SECTION B | 1080/980/880 | Off |
| | SECTION C | 1180/1080/980 | 1200 |
| LOW LOAD CONDITION | SECTION A | 1080/980/880 | Off |
| | SECTION B | 980/880/780 | Off |
| | SECTION C | 1080/980/880 | 1100 |

AIR CONDITIONER AND METHOD FOR CONTROLLING SAME

CROSS-REFERENCE TO RELATED APPLICATIONS

This application is a 371 National Stage of International Application No. PCT/KR2019/015814 filed Nov. 19, 2019, which claims priority to Korean Patent Application No. 10-2018-0146133 filed Nov. 23, 2018, the disclosures of which are herein incorporated by reference in their entirety.

BACKGROUND

1. Field

The disclosure relates to an air conditioner controlling various properties of air in a use space in response to a user's request and a method of controlling the same, and more particularly to an air conditioner and a method of controlling the same, in which an air blowing fan is driven to emit air, which exchanged heat with a heat exchanger, to an indoor environment where the air conditioner is installed in order to cool the indoor environment.

2. Description of Related Art

An air conditioner refers to an apparatus provided to control properties such as temperature, humidity, cleanness, air current, etc. in response to a use space. The air conditioner basically includes an air blower forming air current, and changes at least one of properties of air circulated by the air blower, thereby making the environment of the use space comfortable for a user. The air conditioner is classified according to the properties of air to be controlled, and may for example include an air cooler for cooling air, a dehumidifier for lowering humidity of air, an air cleaner for enhancing cleanness of air.

Among them, the air cooler lowers temperature of a room by a cooling principle based on heat of vaporization. Absorption of heat occurs when liquid is evaporated into gas, and release of heat occurs when gas is condensed into liquid. The heat absorbed for the evaporation is called the heat of vaporization. The air cooler condenses coolant from a gas state into a liquid state by highly changing pressure through a compressor, and evaporates and returns the coolant of the liquid state into vapor by lowering the pressure in an evaporator, so that the vaporized coolant can absorbs heat, thereby lowering ambient temperature. The cooling of the air cooler is performed by a simple cooling cycle capable of efficiently making a lot of heat of vaporization, and such a method is also applied to a refrigerator. Although heat transfers from high temperature to low temperature in a natural phenomenon, the cooling cycle of the air cooler makes heat transfer in an opposite direction from low indoor temperature to high outdoor temperature. To this end, the air cooler includes an indoor unit blowing cold air, and an outdoor unit blowing hot air. In a similar way, the refrigerator makes heat transfer from low temperature inside the refrigerator to high temperature outside the refrigerator.

The indoor unit of the air cooler controls the amount of air to be blown by an air blowing fan based on a predetermined setting temperature set by a user. However, a user may feel displeasure with temperature and air current while the indoor unit is operating, under various states of surrounding environments including an indoor environment where the indoor unit is installed and an outdoor environment where the outdoor unit is installed.

For example, the indoor unit operates for a strong wind of an air blowing amount during an initial operating section for initially lower a indoor temperature based on a setting temperature, and then operates for a weak wind after the indoor temperature reaches the setting temperature. However, the foregoing operation of when the temperature of the surrounding environment is low may cause a user to get a strong feeling of air current on the user's skin. On the other hand, when the indoor unit operates for the weak wind during the initial operating section, the foregoing operation may be performed with a high temperature of the surrounding environment. In this case, temperature stratification in which a temperature gradient suddenly comes out in a vertical direction occurs indoors, and thus a pleasant cooling effect is not provided to a user.

Accordingly, there may be required an air cooler that takes the states of the surrounding environment into account and controls air blowing without giving an unpleasant feeling to a user.

SUMMARY

According to an embodiment of the disclosure, an air conditioner includes: a housing internally including a first channel and a second channel which are different in inlets and outlets and isolated from each other; a heat exchanger provided in the first channel and configured to exchange heat with air; a first fan provided in the first channel and configured to emit air, of which heat is exchanged with the heat exchanger, to the outside of the housing; a second fan provided in the second channel and configured to emit air, which moves along the second channel, to the outside of the housing; a driver configured to drive each of the first fan and the second fan; and a controller configured to control the driver to operate the first fan based on an indoor temperature and an outdoor temperature, and selectively operate the second fan based on a time section in which at least one of the indoor temperature or the outdoor temperature satisfies a preset temperature condition.

Here, the preset temperature condition may include a condition about whether the indoor temperature is higher than a first threshold or the outdoor temperature is higher than a second threshold.

Here, the processor may identify whether the time section satisfying the preset temperature condition is a cooling section where the heat exchanger and the first fan operate for cooling, and operate the second fan when it is identified that the time section is the cooling section.

Here, the processor may prevent the second fan from operating when it is identified that the time section satisfying the preset temperature condition is not the cooling section.

Further, the processor may identify whether the time section dissatisfying the preset temperature condition is an initial cooling section, in which the heat exchanger initially operates, among the cooling sections, prevent the second fan from operating when it is identified that the time section is the initial cooling section but operate the second fan when it is identified that the time section is not the initial cooling section.

Here, the processor may prevent the second fan from operating when it is identified that the time section dissatisfying the preset temperature condition is not the cooling section.

Further, the outlet of the second channel may be disposed above the second fan.

Further, the second fan may be disposed below the first fan.

Further, the air conditioner may further include a punching-hole plate coupled to the housing to cover the outlet of the first channel and including a plurality of punching holes to emit air, wherein the first fan is disposed between the heat exchanger and the punching-hole plate.

Further, the air conditioner may further include a sensor configured to detect the indoor temperature or the outdoor temperature, wherein the processor obtains information about the indoor temperature or the outdoor temperature from the sensor.

Further, according to an embodiment of the disclosure, a method of controlling the air conditioner includes: driving a heat exchanger provided in a first channel to exchange heat with air of the first channel; driving a first fan provided in the first channel based on an indoor temperature and an outdoor temperature to emit the heat-exchanged air of the first channel to the outside; and selectively driving a second fan provided in the second channel different in an inlet and an outlet from the first channel and isolated from the first channel, based on a time section in which at least one of the indoor temperature or the outdoor temperature satisfies a preset temperature condition.

BRIEF DESCRIPTION OF THE DRAWINGS

FIG. 10 shows a table in which revolutions per minute (RPM) of a main fan and a sub fan are tabulated corresponding to load conditions in an indoor unit of an air cooler according to an embodiment of the disclosure.

DETAILED DESCRIPTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, "at least one" among a plurality of elements in the disclosure represents not only all the elements but also each one of the elements, which excludes the other elements or all combinations of the elements.

Figure 1:
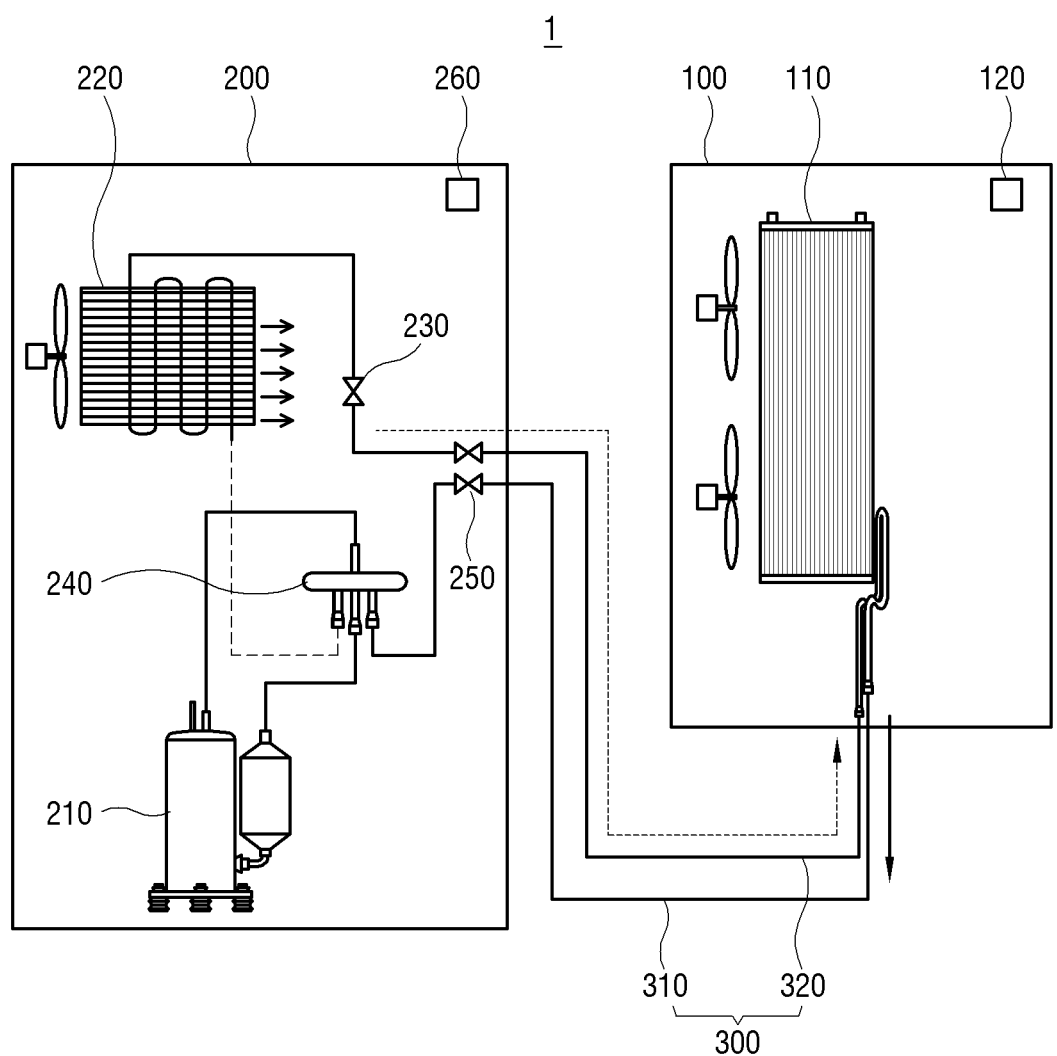
FIG. 1 illustrates a structure of an air cooler according to an embodiment of the disclosure.

FIG. 1 illustrates an exemplary structure of an air cooler according to an embodiment of the disclosure.

As shown in FIG. 1, an air conditioner according to an embodiment of the disclosure is actualized by an air cooler. The air cooler 1 includes an indoor unit 100 to be installed in a first place having an environment of which temperature is desired to be controlled like an interior of a building, and an outdoor unit 200 to be installed in a second place free from the foregoing environment like an exterior of the building. A refrigerant or coolant circulates between the indoor unit 100 and the outdoor unit 200, and each of the indoor unit 100 and the outdoor unit 200 adjusts the state of the refrigerant based on energy, thereby controlling the temperature under the foregoing environment. In this embodiment, one indoor unit 100 and one outdoor unit 200 are provided. However, a plurality of indoor units 100 and a plurality of outdoor units 200 may be designed.

The air cooler 1 basically performs cooling based on heat of vaporization. The refrigerant absorbs heat when liquid is evaporated into gas, but releases heat when gas is condensed into liquid. The heat absorbed when the refrigerant is evaporated is called the heat of vaporization. Because the air cooler 1 employs phase change of the refrigerant between liquid and gas, a refrigerant having a low evaporation point and releasing much heat of vaporization may be used in the air cooler 1. (Original) Further, the refrigerant is required not to corrode the metal for the pipes because the indoor/outdoor pipes of the air cooler 1 are generally made of metal. In addition, the refrigerant is required to stay in a liquid form even at a low temperature according to use locations because problems arise when the refrigerant is frozen in winter.

Below, the structures of the indoor unit 100 and the outdoor unit 200 for the phase change and the circulation of the refrigerant will be described.

The indoor unit 100 includes an indoor heat exchanger 110. The outdoor unit 200 includes a compressor 210, an outdoor heat exchanger 220, an expansion valve 230, a four-way valve 240, and a service valve 250. Further, an external pipe 300 is installed to provide a channel through which the refrigerator is transferred between the indoor unit 100 and the outdoor unit 200. The external pipe 300 includes a first external pipe 310 for providing a channel through which the refrigerant flowing out from the indoor unit 100 flows into the outdoor unit 200, and a second external pipe 320 for providing a channel through which the refrigerant flowing out from the outdoor unit 200 flows in the indoor unit 100.

The indoor heat exchanger 110 serves as an evaporator when the air cooler 1 is in a cooling mode, and changes the refrigerant to have a low pressure and a gaseous state. When the indoor heat exchanger 110 serves as the evaporator, the refrigerant in the indoor heat exchanger 110 becomes gas by absorbing heat from surrounding environments, and temperature around the indoor heat exchanger 110 is lowered. The refrigerant of the low-pressure gas moves from the indoor unit 100 to the outdoor unit 200 through the first external pipe 310, and is introduced into the compressor 210.

The compressor 210 compresses a gaseous cold refrigerant into high-temperature and high-pressure gas. The reason why the compressor 210 compresses the refrigerant is because phase change into liquid is easy at a high temperature. Further, the compressor 210 receives a low-pressure refrigerant and discharges a high-pressure refrigerant to the outdoor heat exchanger 220, forming a circulation cycle for the refrigerant.

The outdoor heat exchanger 220 serves as a condenser when the air cooler 1 is in the cooling mode, and changes a high-temperature and high-pressure refrigerant into a liquid refrigerant by cooling. In other words, the high-temperature and high-pressure refrigerant flowing out of the compressor 210 performs interaction about heat with air in the outdoor heat exchanger 220, and changes into a middle-temperature and high-pressure refrigerant while radiating heat to the outside.

The expansion valve 230 expands a high-pressure and liquefied refrigerant to be changed into a low-pressure and 2-phases refrigerant. Alternatively, the expansion valve 230 may also be designed to additionally perform a function of adjusting a flowing amount of refrigerant. The refrigerant passed through the expansion valve 230 is introduced into the indoor heat exchanger 110 through the second external pipe 320.

The four-way valve 240 refers to a value for changing the circulation cycle of the refrigerant. The four-way valve 240 makes the indoor heat exchanger 110 and the outdoor heat exchanger 220 respectively operate as the evaporator and the condenser when the air cooler 1 is the cooling mode, but makes the indoor heat exchanger 110 and the outdoor heat exchanger 220 respectively operate as the condenser and the evaporator when the air cooler 1 is in a heating mode.

The service valve 250 refers to a valve for allowing a manager to control a vacuum state and replenish a refrigerant, in the circulation cycle for the refrigerant involving the external pipe 300.

Thus, the heat exchange of the refrigerant is performed while the refrigerant circulates in the cycle of the indoor heat exchanger 110, the first external pipe 310, the compressor 210, the outdoor heat exchanger 220, the expansion valve 230 and the second external pipe 320, thereby cooling the first place where the indoor unit 100 is installed.

Meanwhile, the indoor unit 100 includes an indoor-unit sensor 120 for detecting the temperature of the surrounding environment of the indoor unit 100, in other words, the temperature of the first place. Further, the outdoor unit 200 includes an outdoor-unit sensor 260 for detecting the temperature of the surrounding environment of the outdoor unit 200, in other words, the temperature of the second place. The indoor unit 100 and the outdoor unit 200 are provided to communicate with each other, so that the indoor unit 100 can obtain a detection result of the outdoor-unit sensor 260 from the outdoor unit 200.

However, the method by which the indoor unit 100 obtains the temperature of the first place and the temperature of the second place is not limited to that of the foregoing embodiment. For example, the indoor unit 100 may obtain a detection result from a separate external device for detecting the temperature of the first place or the temperature of the second place under environments of Internet of things (IoT). This detection result may be transmitted from the external device to the indoor unit 100 through direct communication, or transmitted from the external device to the indoor unit 100 via a server through a wide area network.

Alternatively, the indoor unit 100 may provide a user interface through which a user is allowed to input the temperature of the first place or the second place. The indoor unit 100 may be provided to allow a user to input a specific numerical value of temperature. Alternatively, the indoor unit 100 may provide a plurality of profiles about weather, date, season, etc. to be selectable, and estimate temperature corresponding to a certain profile selected by a user. For example, when a user selects a profile of "a fine day in August", the indoor unit 100 may estimate and obtain temperature corresponding to the selected profile.

Below, the indoor unit 100 will be described.

Figure 2:
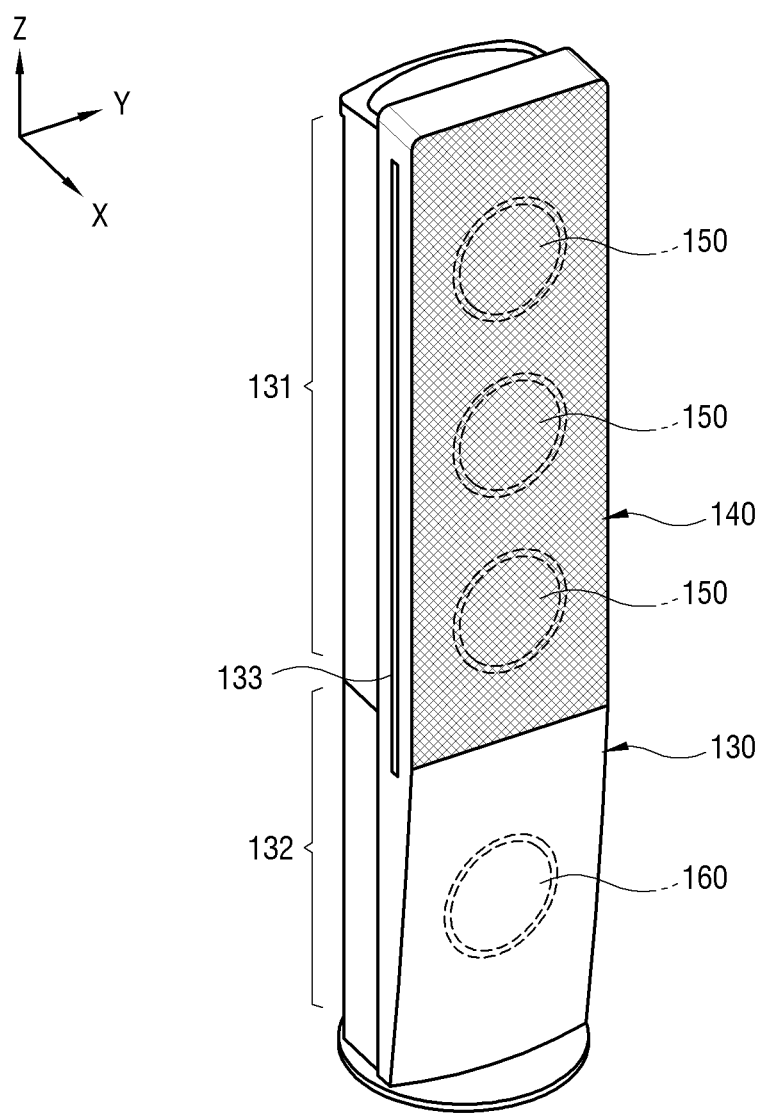
FIG. 2 is a perspective view of an outer appearance of an indoor unit according to an embodiment of the disclosure.

FIG. 2 is a perspective view of an outer appearance of an indoor unit according to an embodiment of the disclosure.

As shown in FIG. 2, the indoor unit 100 includes a housing 130 forming an outer appearance and accommodating therein various components of the indoor unit 100, a punching-hole plate 140 coupled to the housing 130, a main fan 150 installed at an upper inner side of the housing 130 and facing the punching-hole plate 140, and a sub fan 160 installed in a lower inner side of the housing 130. The housing 130 is shaped like a quadrangular pillar when the indoor unit 100 is a floor standing type, but this embodiment does not limit the shape of the indoor unit 100. In this embodiment, the main fan 150 and the sub fan 160 are termed for convenience of description, and used to distinguish between them without limiting their functions. For example, the main fan 150 may also be termed a first fan, and the sub fan 160 may also be termed a second fan.

Below, for convenience of description, the areas of the housing 130 will be described. When the housing 130 is viewed from the front by a user, the surface of the housing 130 oriented toward the user in the X direction will be termed a 'front surface.' The surface of the housing 130 opposite to the front surface will be termed a 'back surface.' The surfaces of the housing 130 provided between the front surface and the back surface and substantially respectively oriented in the −Y direction and the Y direction will be termed a left surface and a right surface. Further, the housing 130 is divided into an upper side and a lower side along the vertical Z direction.

The front surface of the housing 130 is opened at the upper side, and the punching-hole plate 140 covering this opened area is coupled to the front surface of the housing 130. The punching-hole plate 140 includes a plastic or metal plate formed with a plurality of fine punching holes. The punching-hole plate 140 emits air inside the housing 130 to the outside, and decreases the speed of the emitted air while distributing the emitted air through the plurality of fine punching holes.

Meanwhile, the housing 130 includes a main inlet 131 including a through hole formed at the upper side of the back surface, a sub inlet 132 including the through hole formed at the lower side of the back surface, and a sub outlet 133 including the through hole formed at each upper side of the left surface and the right surface. The external air introduced into the housing 130 through the main inlet 131 is emitted again to the outside through the punching-hole plate 140.

Meanwhile, the external air introduced into the housing 130 through the sub inlet 132 is emitted to the outside through the sub outlet 133. In the housing 130, the main inlet 131 is disposed above the sub inlet 132, and the sub outlet 133 is disposed above the sub inlet 132.

The main fan 150 is accommodated in an upper accommodating space of the housing 130, and disposed to face the rear of the punching-hole plate 140. In this embodiment, three main fans 150 are installed in the Z direction, but there are no limits to the number of main fans 150. The main fan 150 spins at designated revolutions per minute (RPM), so that air introduced through the main inlet 131 can be blown to pass the indoor heat exchanger and be emitted through the punching-hole plate 140.

The sub fan 160 is accommodated in a lower accommodating space of the housing 130. The sub fan 160 spins at designated RPM, so that air introduced through the sub inlet 132 can be blown to be emitted through the sub outlet 133.

Here, two channels are provided inside the housing 130. The first channel refers to a channel that passes by the main inlet 131, the indoor heat exchanger (see '110' in FIG. 1), the main fan 150, and the punching-hole plate 140. The second channel refers to a channel that passes by the sub inlet 132, the sub fan 160, and the sub outlet 133. The first channel and the second channel are isolated from each other without communication inside the housing 130. In other words, air emitted via the first channel is cooled by the indoor heat exchanger, but air emitted via the second channel is not cooled. Air emitted via the sub outlet 133 is mixed with air emitted through the punching-hole plate 140 in front of the punching-hole plate 140.

Air blown by the sub fan 160 is not the cooled air, whereas air blown by the main fan 150 is the cooled air. Therefore, the air blowing amount of the blown air is increased in a case where both the main fan 150 and the sub fan 160 are driven together, like a case where the RPM of only the main fan 150 is increased. However, in the former case as compared with the latter case, quick cooling is possible while preventing a user from excessively getting a feeling of air current, and cooling is possible while efficiently using electric power.

Below, the structure of the indoor unit 100 will be described.

Figure 3:
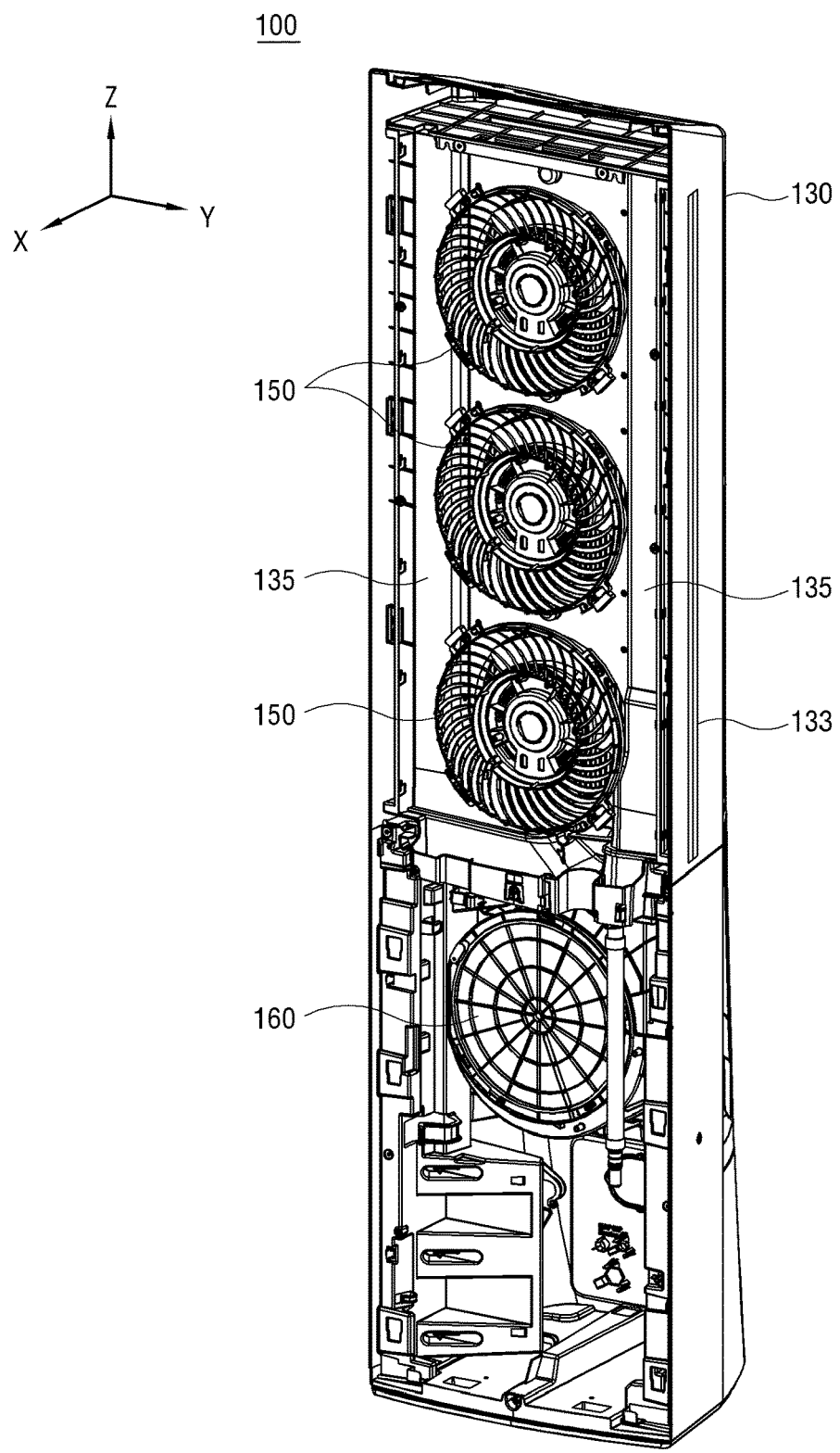
FIG. 3 is a lateral cross-section view of schematically showing positions of main fans and a sub fan in an indoor unit of an air cooler according to an embodiment of the disclosure.

FIG. 3 is a lateral cross-section view of schematically showing positions of main fans and a sub fan in an indoor unit of an air cooler according to an embodiment of the disclosure.

Figure 4:
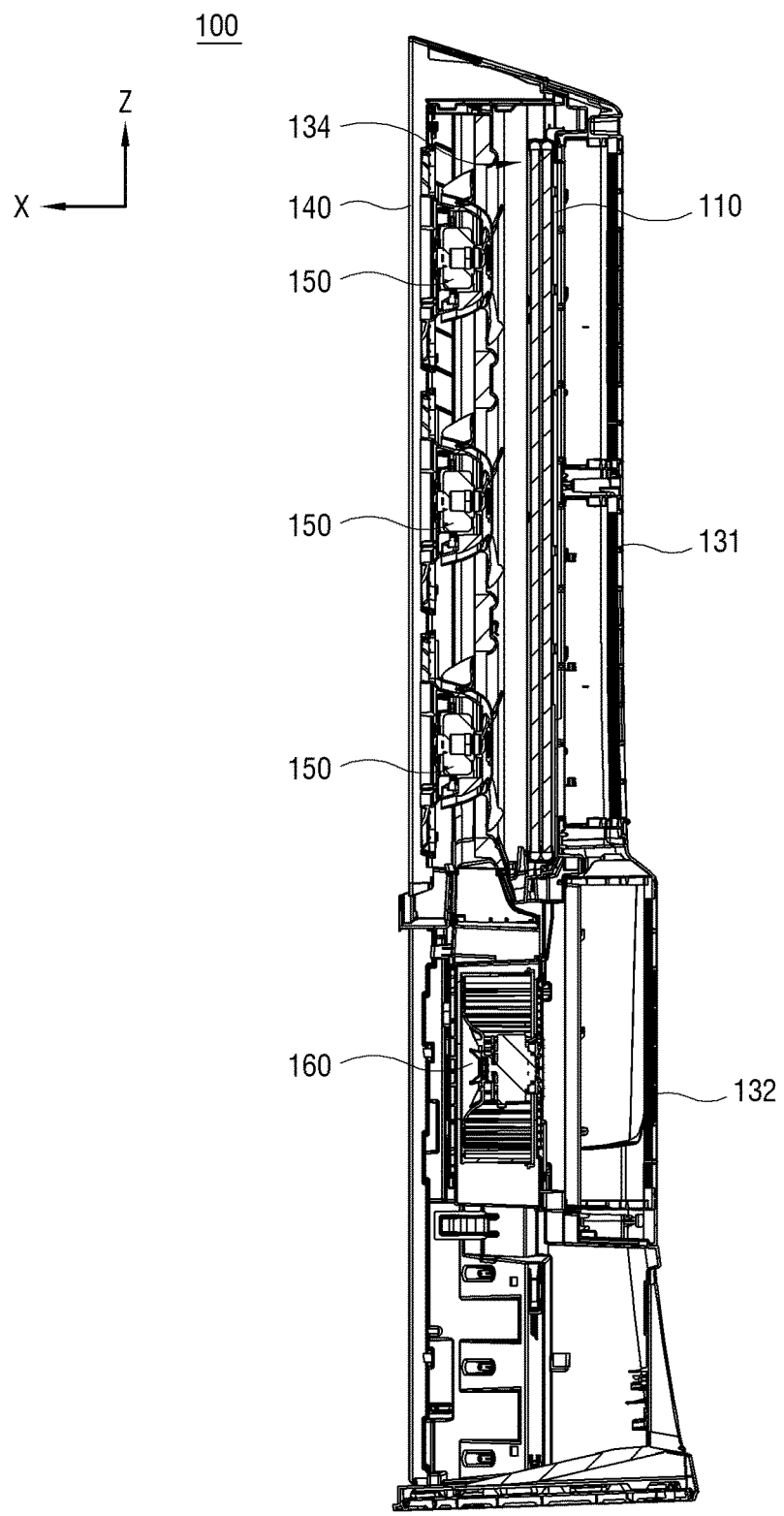
FIG. 4 is a cross-section view of schematically showing the positions of the main fans and the sub fan, viewed from the front, in the indoor unit of FIG. 3

FIG. 4 is a cross-section view of schematically showing the positions of the main fans and the sub fan, viewed from the front, in the indoor unit of FIG. 3

As shown in FIGS. 3 and 4, the indoor unit 100 includes a first channel 134 formed between the main inlet 131 and the punching-hole plate 140 and extended in the X direction at the upper side of the housing 130. On the first channel 134, the indoor heat exchanger 110 is provided, and the main fan 150 is provided between the indoor heat exchanger 110 and the punching-hole plate 140 on the first channel 134. As the indoor heat exchanger 110 and the main fan 150, air inhaled through the main inlet 131 is cooled and emitted through the punching-hole plate 140.

Further, the indoor unit 100 includes a second channel 135 extended from the lower side of the housing 130 to the upper side. The second channel 135 is extended branching off in a Y-shape when viewed from the front. The sub inlet 132 and the sub fan 160 are arranged in a lower area of the Y-shape, and the sub outlets 133 are respectively arranged in branching upper areas of the Y-shape side.

The first channel 134 and the second channel 135 do not communicate with each other but isolated by a partition or the like from each other. Therefore, air passing through the first channel 134 does not meet air passing through the second channel 135 in the housing 130. If the first channel 134 and the second channel 135 communicate with each other, cooled air passing through the first channel 134 meets uncooled air passing through the second channel 135, and thus the inside of the housing 130 gets damp due to difference in temperature. Therefore, the first channel 134 and the second channel 135 in this embodiment are isolated, so that air emitted through the punching-hole plate 140 and air emitted through the sub outlet 133 can meet outside the housing 130.

Usually, cold air is collected at a lower side in an indoor space while hot air is collected at an upper side in the indoor space. The indoor heat exchanger 110 is disposed at the upper side of the indoor unit 100, and thus the indoor unit 100 cools relatively hot air at the upper side of the indoor space and emits it to the first channel 134. Meanwhile, the sub fan 160 is disposed at the lower side of the indoor unit 100, and thus the indoor unit 100 draws relatively cold air from the lower side of the indoor space and emits it to the upper side of the indoor space via the second channel 135.

Thus, the sub fan 160 serves to stir air current inside the indoor space and move relatively cold air to the upper side of the indoor space. In this case, air moved by the sub fan 160 is mixed with cooled air moved by the main fan 150 at the upper side of the indoor space, so that the indoor unit 100 can adjust an indoor temperature to temperature at which a user feels pleasant.

Below, the control configuration of the indoor unit 100 will be described.

Figure 5:
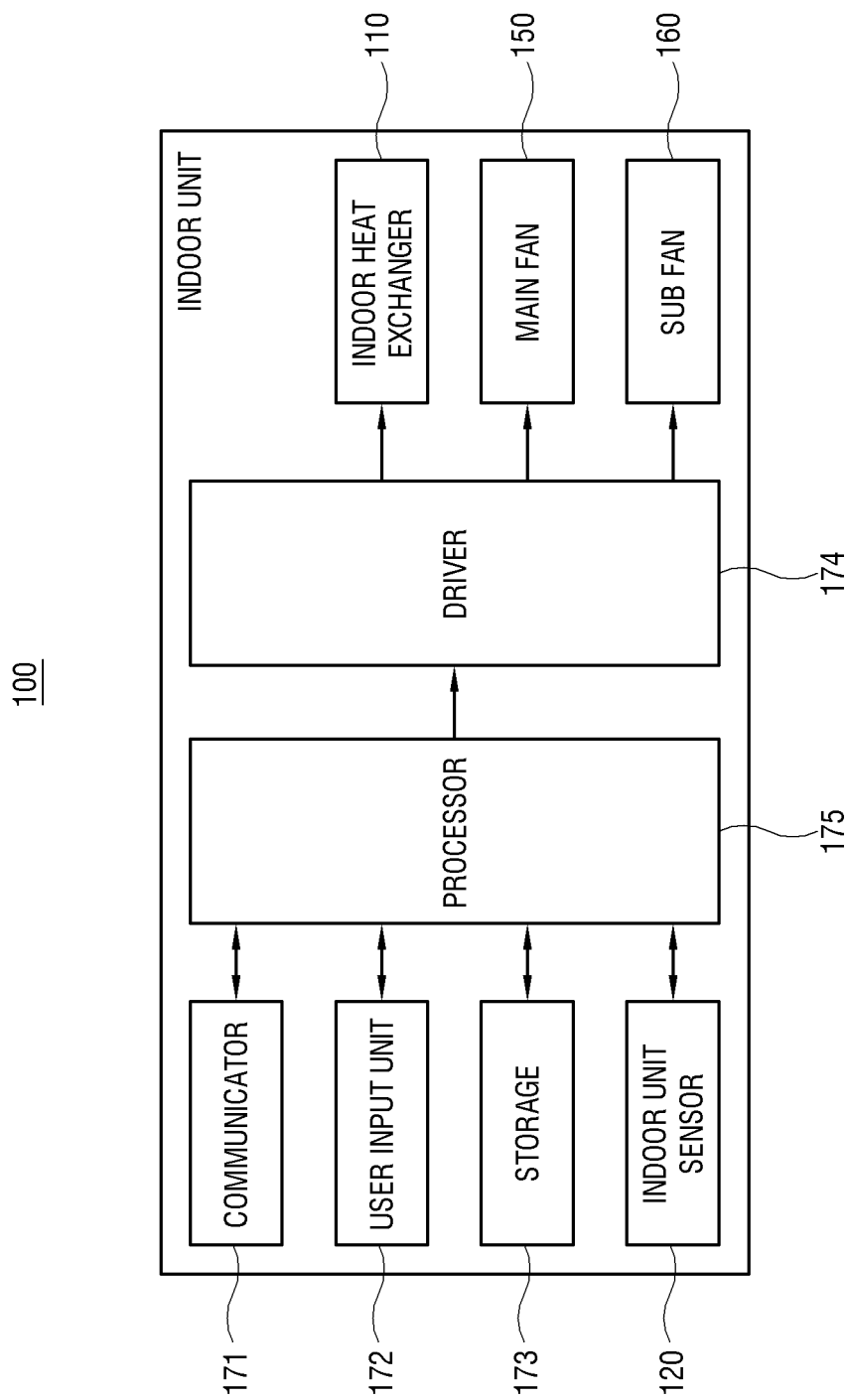
FIG. 5 is a block diagram of an indoor unit of an air cooler according to an embodiment of the disclosure.

FIG. 5 is a block diagram of an indoor unit of an air cooler according to an embodiment of the disclosure.

As shown in FIG. 5, the indoor unit 100 includes a communicator 171 configured to communicate with various external apparatuses such as the outdoor unit, a user input unit 172 configured to perform a user input, a storage 173 configured to store data is stored, a driver 174 configured to drive various elements of the indoor unit 100, an indoor-unit sensor 120 configured to detect the temperature of the first place where the indoor unit 100 is installed, and a controller or processor 175 configured to control the driver 174 based on a detection result of the indoor-unit sensor 120.

The communicator 171 includes an interactive communication circuit that includes at least one of elements, such as communication modules, communication chips, etc. corresponding to various wired and wireless communication protocols. For example, the communicator 171 may be embodied by a wireless communication module configured to perform wireless communication with an access point (AP) through Wi-Fi, a local area network (LAN) card connected to a router or a gateway by a wire, or a port to which a cable based on dedicated or universal signal transmission standards is connected. The communicator 171 communicates with the outdoor unit and received predetermined information from the outdoor unit.

The user input unit 172 includes various input interfaces provided for allowing a user to make an input, and includes a display for displaying an input state of a user or a current state of the air cooler. The user input unit 172 may for example include mechanical or electronic buttons, a remote controller, or a touch screen of the indoor unit 100.

The storage 173 is accessed by the processor 175, and performs operations such as reading, recording, modifying, deleting, updating, etc. for data under control of the processor 175. The storage 173 includes a flash memory or the like nonvolatile memory in which data is retained regardless of whether power is supplied or not; and a buffer, a random access memory (RAM) or the like volatile memory to which processing data is loaded The driver 174 includes a plurality of motors to drive the indoor heat exchanger 110, the main fan 150, the sub fan 160 and the like elements of the indoor unit 100, which mechanically operate. For example, the driver 174 drives the main fan 150 or the sub fan 160 to spin at a designated RPM based on applied voltage.

The indoor-unit sensor 120 is provided at one side of the indoor unit 100 and detects the temperature of the first place where the indoor unit 100 is installed, thereby informing the processor 175 of the detected temperature. The indoor-unit sensor 120 may employ various temperature sensors as long as it can detect the temperature around the indoor unit 100, and there are no limits to the indoor-unit sensor 120.

The processor (or controller) 175 includes one or more hardware processors achieved by a central processing unit (CPU), a chipset, a microcontroller, circuit, etc. which are mounted on a printed circuit board (PCB). Alternatively, the processor 175 may be designed as a system on chip (SoC). The processor 175 is a hardware main agent to perform general operations of the indoor unit 100. In other words, the processor 175 executes a preset instruction stored in the storage 173, so that the operations of the indoor unit 100 can be performed. From a software point of view, a predetermined operation of the indoor unit 100 is performed by an operating system or a kernel, or an application program running on the kernel, and the processor 175 performs calculation, process and control of data to execute the software. For example, the processor 175 executes the operating system or kernel of the indoor unit 100, and also executes an application or a program on the kernel, thereby performing the process.

In this embodiment, the processor 175 obtains a first temperature value of the first place detected by the indoor-unit sensor 120 and a second temperature value of the second place detected by the outdoor-unit sensor from the outdoor unit through the communicator 171. The processor 175 drives the main fan 150 based on the first temperature value and the second temperature value, and also selectively drives the sub fan 160 corresponding to a time section in which at least one of the first temperature value and the second temperature value satisfies a preset temperature condition.

Below, the detailed operations of the processor 175 will be described.

Figure 6:
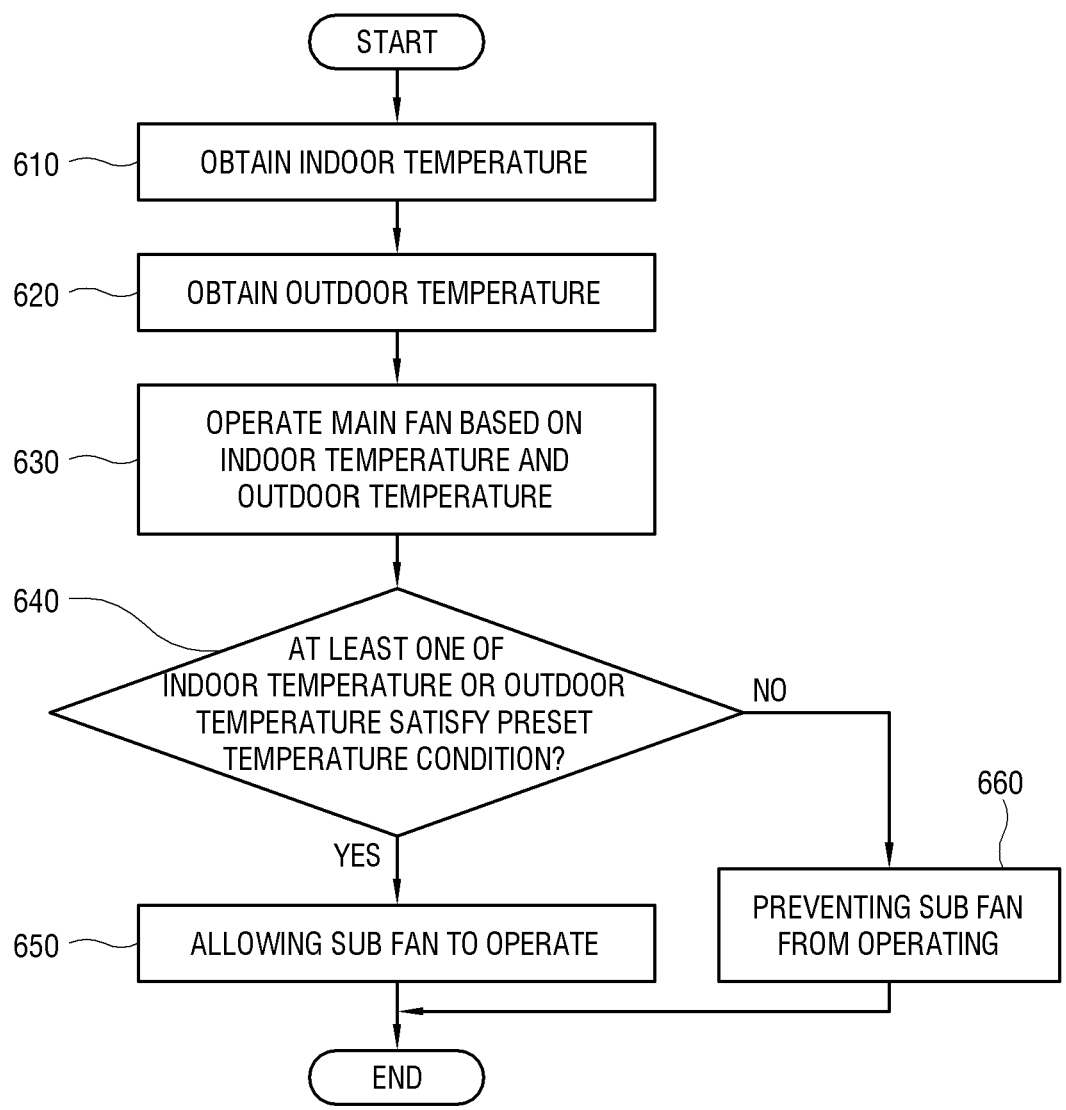
FIG. 6 is a flowchart showing a method of controlling an indoor unit of an air cooler according to an embodiment of the disclosure.

FIG. 6 is a flowchart showing a method of controlling an indoor unit of an air cooler according to an embodiment of the disclosure.

As shown in FIG. 6, the following operations are performed by the processor of the indoor unit.

At operation 610 the indoor unit obtains an indoor temperature detected by the indoor-unit sensor.

At operation 620 the indoor unit obtains an outdoor temperature detected by the outdoor-unit sensor from the outdoor unit. In this embodiment, the indoor temperature is the temperature of the first place where the indoor unit is installed, and the outdoor temperature is the temperature of the second place where the outdoor unit is installed. Usually, the first place refers to an indoor place and the second place refers to an outdoor place, but the first place and the second place are not limited to specific places.

At operation 630 the indoor unit operates the indoor heat exchanger and the main fan based on the indoor temperature and the outdoor temperature. In this case, the indoor unit controls the operations of the indoor heat exchanger and the main fan so that the indoor temperature can be within a preset temperature range of the setting temperature designated by a user.

At operation 640 the indoor unit identifies whether at least one of the indoor temperature and the outdoor temperature satisfies a preset temperature condition while the main fan operates.

In a certain time section, when it is identified that at least one of the indoor temperature and the outdoor temperature satisfies the preset temperature condition, at operation 650 the indoor unit operates the sub fan together with the main fan in this time section.

On the other hand, in a certain time section, when it is identified that at least one of the indoor temperature and the outdoor temperature does not satisfy the preset temperature condition, at operation 660 the indoor unit does not operate the sub fan in this time section.

Thus, the indoor unit takes the states of the surrounding environment including the indoor and outdoor environments into account, and controls air blowing while preventing a user from feeling unpleasant with air current emitted from the indoor unit, thereby performing cooling.

Below, it will be described in detail by way of example that the indoor unit according to this embodiment selectively drives the sub fan based on the time section in which at least one of the indoor temperature and the outdoor temperature satisfies the preset temperature condition.

Figure 7:
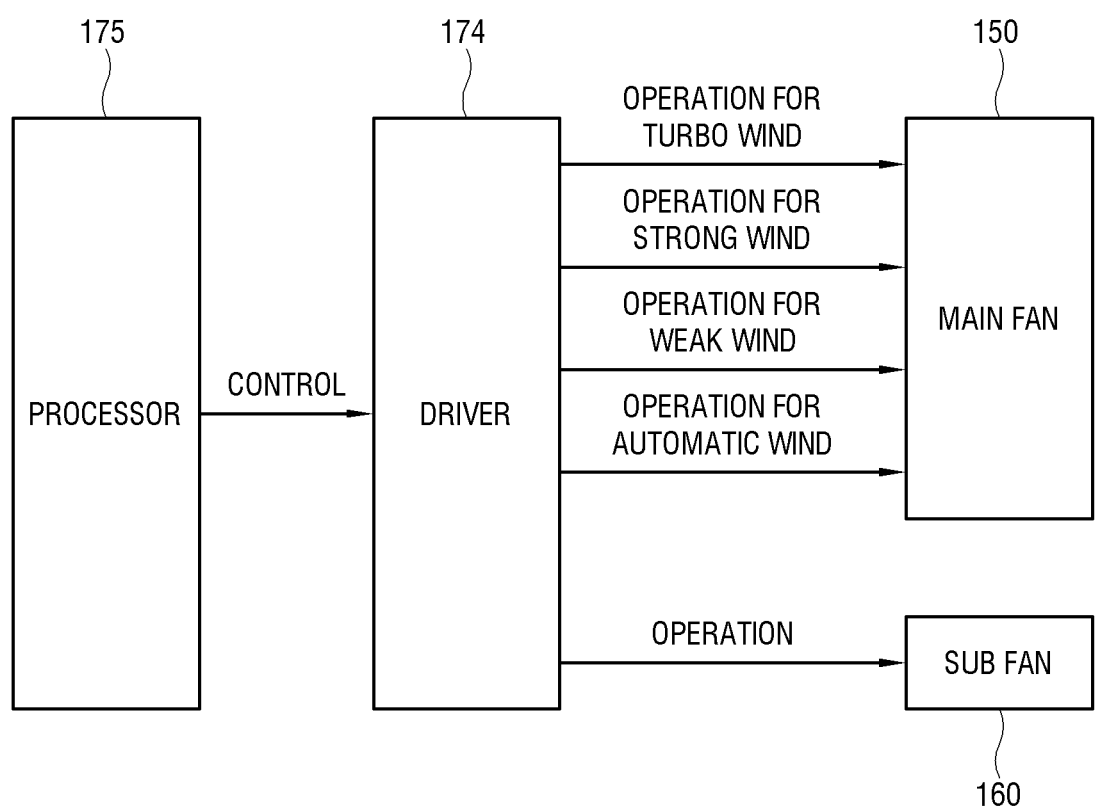
FIG. 7 illustrates a method by which a driver of an indoor unit controls a main fan and a sub fan according to an embodiment of the disclosure.

FIG. 7 illustrates a method by which a driver of an indoor unit controls a main fan and a sub fan according to an embodiment of the disclosure.

As shown in FIG. 7, the driver 174 individually drives the main fan 150 and the sub fan 160, drives only the main fan 150 based on conditions, or drives both the main fan 150 and the sub fan 160 at once. The driver 174 drives the main fan 150 or the sub fan 160 to spin at a preset RPM based on applied voltage.

For example, the driver 174 drives the main fan 150 in one or modes such as a turbo wind, a strong wind, a weak wind, and an auto wind. Here, the automatic wind may for example refers to a mode of alternating the turbo wind and the weak wind. Such modes are termed for convenience of distinguishing between them, and the terms themselves do not limit the meaning of the modes. Further, the driver 174 selectively drives the sub fan 160 to be combined with four modes of the main fan 150, thereby driving the main fan 150 and the sub fan 160 in a total of eight modes.

The main fan 150 or the sub fan 160 may include only a single fan or a plurality of fans. In this embodiment, three main fans 150 are installed in a vertical direction, and one sub fan 160 is installed below the main fan 150. However, there are no limits to the number of main fans 150 or the number of sub fans 160.

When there is a plurality of main fans 150, the main fans 150 may spin at the same RPM under one mode, or may spin at different RPM even under one mode. For example, when three main fans 150 are arranged in the vertical direction, the RPM of the main fan 150 disposed at the upper side may be set to be faster than the RPM of the main fan 150 disposed at the lower side in one mode. This is to more efficiently cool the indoor place because hot air is lighter than cold air.

The processor 175 measures the indoor temperature when a system is initially powered on, and performs a cooling process by operating the driver 174 so that the indoor temperature falls toward a setting temperature set by a user. In this case, the processor 175 identifies a time section in which at least one of the indoor temperature and the outdoor temperature satisfies a preset temperature condition, and selectively operates the sub fan 160 based on the identified time section. Here, the temperature condition is related to a load condition about the operations of the air cooler. Below, the load condition will be described.

The load condition is mainly related to the temperature of the environment where the air cooler is installed, i.e. the indoor temperature and the outdoor temperature with respect to the installation position of the indoor unit 100. The load condition may be divided into a high load condition that applies a relatively high load to the air cooler, and a low load condition that applies a relatively low load to the air cooler.

The high load condition refers to a case where at least one of the indoor temperature and the outdoor temperature is relatively high. Specifically, the high load condition includes three cases of a condition where the indoor temperature is higher than a first threshold and the outdoor temperature is not higher than a second threshold, a condition where the indoor temperature is not higher than the first threshold and the outdoor temperature is higher than the second threshold, and a condition where the indoor temperature is higher than the first threshold and the outdoor temperature is higher than the second threshold. Here, the first threshold and the second threshold are preset temperatures without being limited to specific numerical values. For example, the first threshold may be set as about 27 degrees Celsius, and the second threshold may be set as about 30 degrees Celsius.

The high load condition may for example include a case where fire is used indoors for cooking or a number of people gathers indoors even though the outdoor temperature is low, a case where the indoor temperature is expected to rise due to radiant heat of a high outdoor temperature even though the indoor temperature is low, etc.

The low load condition refers to a case where both the indoor temperature and the outdoor temperature are relatively low. Specifically, the low load condition includes a case that the indoor temperature is lower than the first threshold and the outdoor temperature is lower than the second threshold. The low load condition may for example include conditions of evening, night, a rainy season, etc.

The results from operating the air cooler to adjust the indoor temperature based on the setting temperature are the same under both the high load condition and the low load condition, but the high load condition and the low load condition are different in an operating environment. Therefore, detailed operations of the air cooler are varied depending on the conditions. Below, the detailed operations of the air cooler according to the load conditions will be described.

Figure 8:
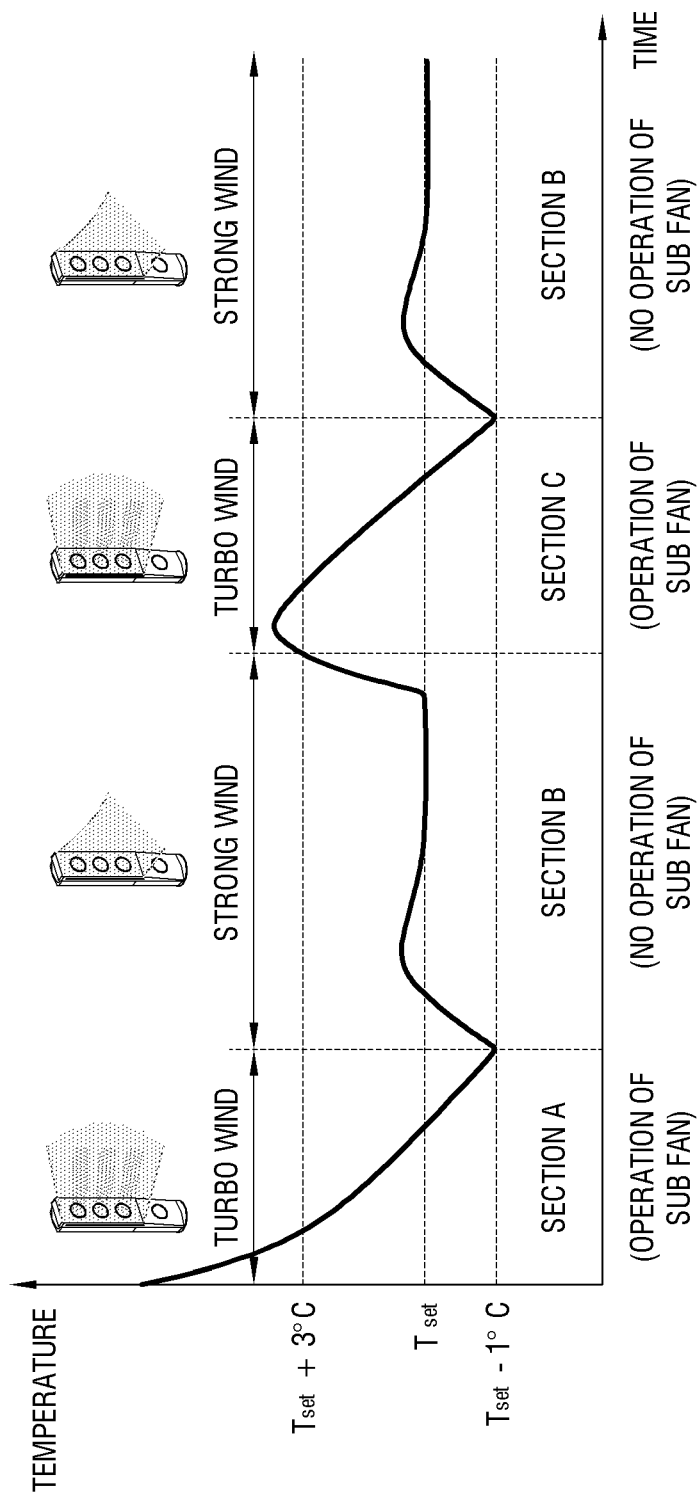
FIG. 8 is a graph showing changes in temperature versus time based on a method by which an indoor unit of an air cooler operates under a high load condition according to an embodiment of the disclosure.

FIG. 8 is a graph showing changes in temperature versus time based on a method by which an indoor unit of an air cooler operates under a high load condition according to an embodiment of the disclosure.

As shown in FIG. 8, the indoor unit checks the setting temperature and the indoor temperature when initially operates. The setting temperature refers to a temperature value set by a user or set in a default. The indoor temperature is detected by the indoor-unit sensor provided in the indoor unit. The indoor unit obtains the outdoor temperature from the outdoor unit, and identifies the load condition based on the indoor temperature and the outdoor temperature.

When the setting temperature is Tset, a preset cooling temperature range may be set based on Tset. The cooling temperature range ranges from a temperature of (Tset−first value) to a temperature of (Tset+second value), and the indoor unit operates to make the indoor temperature be in such a cooling temperature range. Here, the first value and the second value are preset values but not limited to specific numerical values. In this embodiment, the first value and the second value may for example set as 1 degree and 3 degree, respectively.

The indoor unit cools the indoor place by operating the indoor heat exchanger and the main fan until the indoor temperature reaches (Tset−1) degrees from an initial operating point in time. Here, the initial operating point in time refers to a point in time when the indoor unit initially operates the indoor heat exchanger and the main fan for cooling after the indoor unit is powered on. Such an initial cooling section will be called a section A.

When the indoor temperature reaches (Tset−1) degrees, the indoor unit operates the indoor heat exchanger and the main fan by changing the mode, thereby maintaining the cooling temperature range as the indoor temperature does not fall any more. Such a section of maintaining the cooling temperature range will be called a section B.

When the indoor temperature rises up to (Tset+3) degrees, the indoor unit cools the indoor place by operating the indoor heat exchanger and the main fan so that the indoor temperature can fall up to (Tset−1) degrees. Such an intermediate cooling section will be called a section C. Then, the indoor unit operates alternating between the section B and the section C.

As shown in the graph, the indoor unit operates adjusting the indoor temperature not to go out of the cooling temperature range with respect to Tset. Although Tset is changed by a user's input, the indoor unit operates based on the foregoing principle.

With such an operating principle, a method, by which the indoor unit drives the main fan and the sub fan under the identified high load condition, will be described.

Under the high load condition, the indoor unit operates the main fan for the turbo wind in the section A, for the strong wind in the section B, and for the turbo wind in the section C. Because the high load condition is a condition that causes the temperature to suddenly rise and a user to easily feel hot, it may be more important for a user to rapidly lower the indoor temperature than to avoid a feeling of strong air current. Thus, the indoor unit operates the sub fan in the section A and the section C. As the sub fan operates, the air current of the turbo wind caused by the main fan becomes stronger, thereby having an improved cooling effect. In particular, the indoor unit operates the main fan for the turbo wind and operates the sub fan in order to improve a cooling effect a user feels between the section A and the section C and prevent temperature difference between upper and lower indoor sides due to temperature stratification.

On the other, the section B refers to a section where a user relatively sensitively gets a feeling of air current because the indoor temperature is within the cooling temperature range. Therefore, the indoor unit operates only the main fan without operating the sub fan in the section B.

Below, operations in the low load condition will be described.

Figure 9:
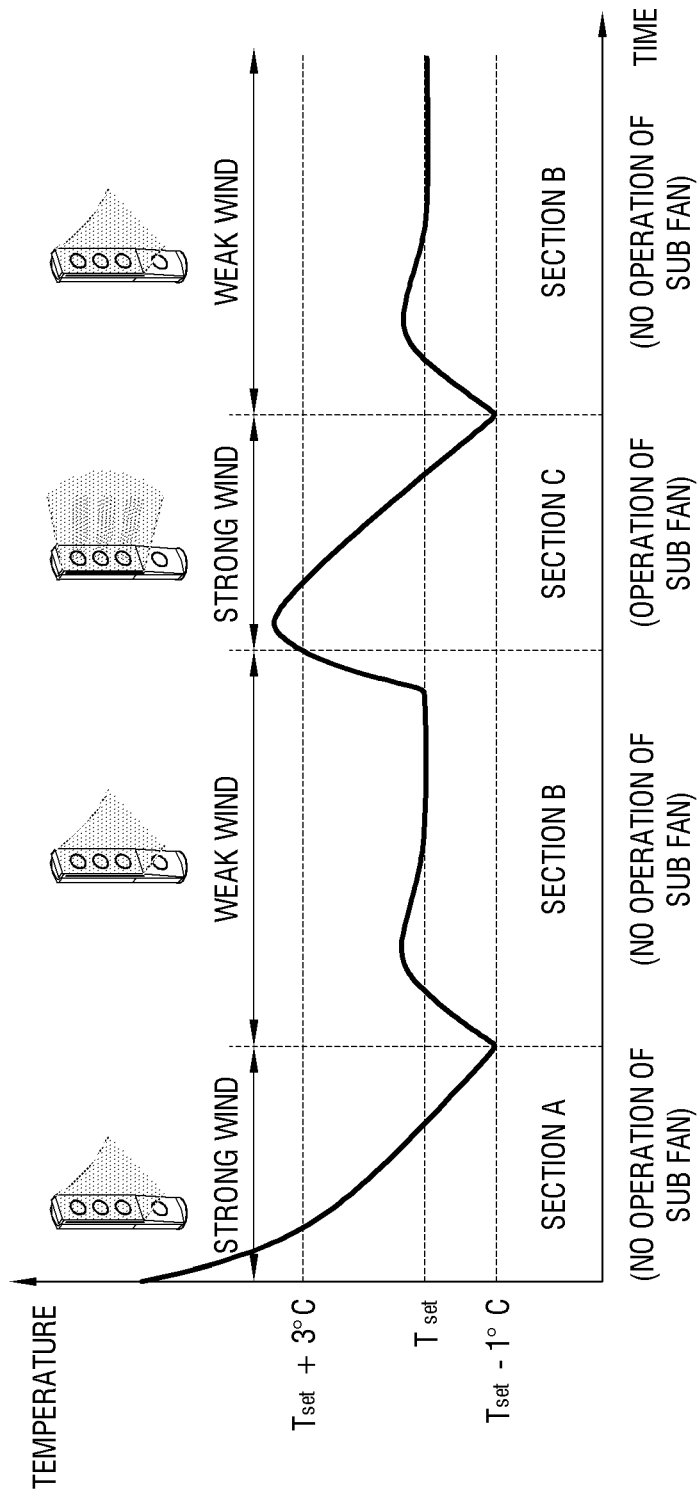
FIG. 9 is a graph showing changes in temperature versus time based on a method by which an indoor unit of an air cooler operates under a low load condition according to an embodiment of the disclosure.

FIG. 9 is a graph showing changes in temperature versus time based on a method by which an indoor unit of an air cooler operates under a low load condition according to an embodiment of the disclosure.

As shown in FIG. 9, the indoor unit operates to maintain the indoor temperature within the preset cooling temperature range with respect to the setting temperature Tset. The basic operating principle of the indoor unit is the same as described above in the foregoing embodiment.

Under the low load condition, the indoor temperature and the outdoor temperature are all relatively low, and therefore the temperature stratification may be less serious than that of the high load condition and a user may not sensitively react to a cooling issue. Therefore, the indoor unit operates the main fan at a lower RPM mode than that of the high load condition during the whole operating section. For example, the indoor unit operates the main fan for the strong wind in the section A, for the weak wind in the section B, and for the strong wind at the section C.

Meanwhile, a user may sensitively react to a feeling of air current rather than the cooling under the low load condition. For example, a user may want the rapid cooling even though the user gets the feeling of air current to some extent under the high load condition. On the other hand, a user may more sensitively get a feeling of air current on the user's skin because the user is at a relatively low temperature under the low load condition.

Thus, the indoor unit does not operate the sub fan in the section A and the section B. In particular, the section A corresponds to the initial operation in which the rapid cooling is less important than that of the high load condition, and therefore there is needed an operation method of putting more emphasis on a feeling of air current. Accordingly, the indoor unit operates the sub fan in the section A under the high load condition, but does not operate the sub fan in the section A under the low load condition.

The section B is a section where a user relatively sensitively gets a feeling of air current because the indoor temperature is within the cooling temperature range. Therefore, the indoor unit does not operate the sub fan in the section B, but operates only the main fan.

Meanwhile, when the indoor temperature rises above (Tset+3) degrees beyond the cooling temperature range, there is needed an operation for lowering the indoor temperature to be again within the cooling temperature range. In this case, the indoor unit operates the sub fan in the section C for the rapid cooling even while accepting a feeling of air current to some extent. However, the RPM of the main fan is lower than the RPM under the low load condition is lower than the RPM of the main fan under the high load condition, and thus a user feels a relatively weak feeling of air current in the section C.

As described above, the indoor unit according to an embodiment drives the main fan and the sub fan based on each of the high load condition and the low load condition, thereby providing a pleasant cool environment in consideration of a temperature and an issue of an air current feeling a user feels.

Below, a method by which the indoor unit controls the main fan and the sub fan will be described.

FIG. 10 shows a table in which RPMs of a main fan and a sub fan are tabulated corresponding to load conditions in an indoor unit of an air cooler according to an embodiment of the disclosure.

As shown in FIG. 10, the indoor unit may refer a table 1000 in which the RPMs of the main fan and the sub fan are designated according to time sections under each of the high load condition and the low load condition. For example, when the indoor unit includes three main fans and one sub fan and the main fans are arranged in the vertical direction, the main fans may be designated with different RPMs in the table 1000. In the table 1000, the higher the main fan is disposed among the plurality of main fans, the higher the designated RPM is because hot air rises up in the indoor place.

The indoor unit identifies the load condition based on the indoor temperature and the outdoor temperature. For example, the indoor unit identifies the high load condition when the indoor temperature is higher than 27 degrees or when the outdoor temperature is higher than 30 degrees. On the other hand, the indoor unit identifies the low load condition when the indoor temperature is not higher than 27 degrees and the outdoor temperature is not higher than 30 degrees. The indoor unit obtains the RPMs of the main fan and the sub fan, which match a time section under such an identified load condition, and operates the main fan or the sub fan based on the obtained RPM.

The section A indicates an initial cooling section, the section B indicates a cooling temperature-range maintaining section, the section C indicates an intermediate cooling section, and these sections are equivalent to those described in the foregoing embodiment.

Under the high load condition, the indoor unit operates the plurality of main fans to spin at RPMs of '1180', '1080' and '980', and operates the sub fan to spin at an RPM of '1200' in the section A with reference to the table 1000. The indoor unit operates the plurality of main fans to spin at RPMs of '1080', '980' and '880', and operates the sub fan not to spin in the section B. The indoor unit operates the plurality of main fans to spin at RPMs of '1180', '1080' and '980', and operates the sub fan to spin at an RPM of '1200' in the section C.

Meanwhile, under the low load condition, the indoor unit operates the plurality of main fans to spin at RPMs of '1080', '980' and '880', and operates the sub fan not to spin in the section A with reference to the table 1000. The indoor unit operates the plurality of main fans to spin at RPMs of '980', '880' and '780', and operates the sub fan not to spin in the section B. The indoor unit operates the plurality of main fans to spin at RPMs of '1080', '980' and '880', and operates the sub fan to spin at an RPM of '1100' in the section C.

Thus, the indoor unit controls the operations of the main fan and the sub fan with reference to the previously stored table 1000.

Below, a method, by which the indoor unit according to an embodiment controls the sub fan to operate, will be described.

Figure 11:
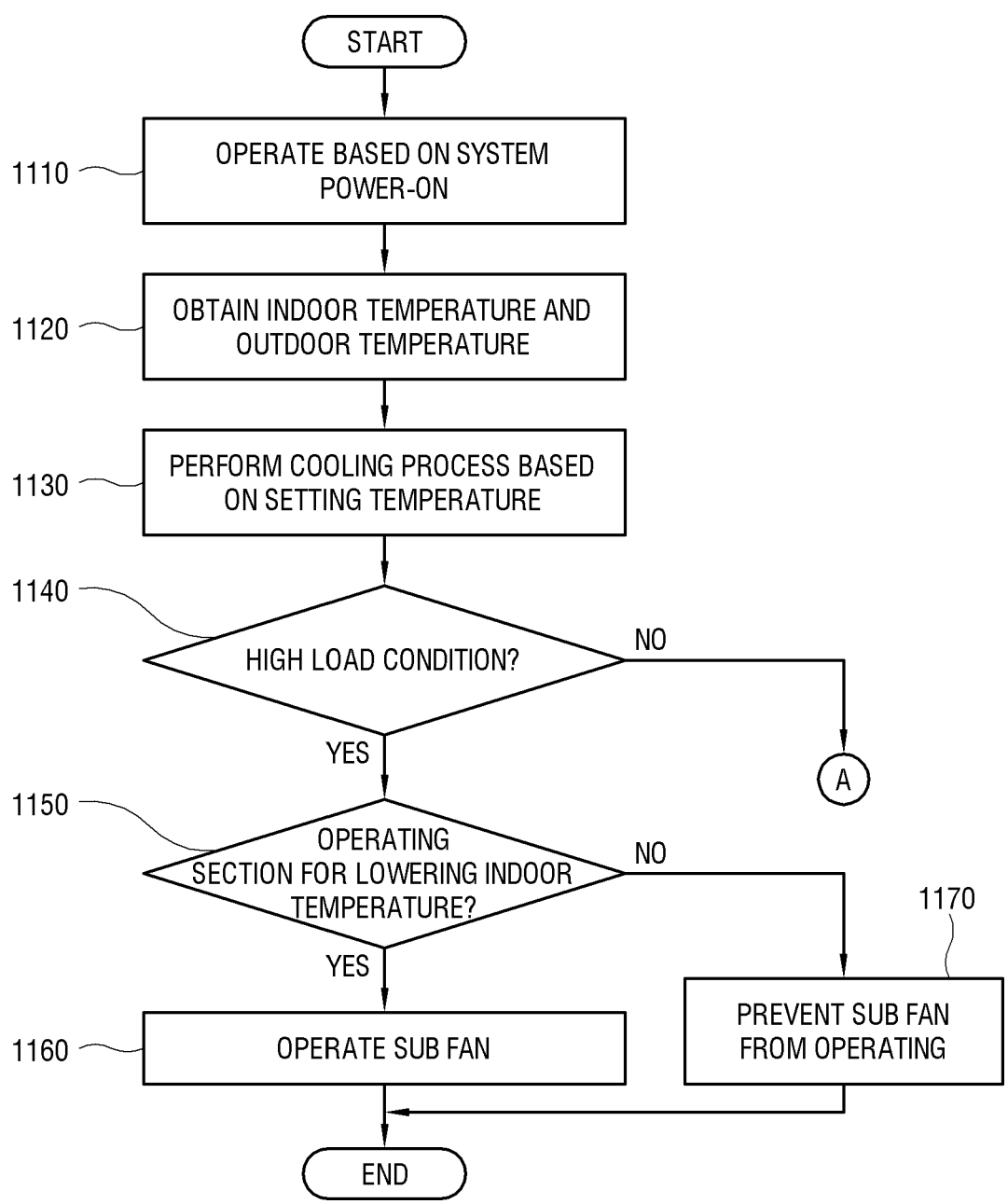
FIGS. 11 and 12 are flowcharts showing a method by which an indoor unit of an air cooler controls a sub fan to be driven according to an embodiment of the disclosure.
Figure 12:
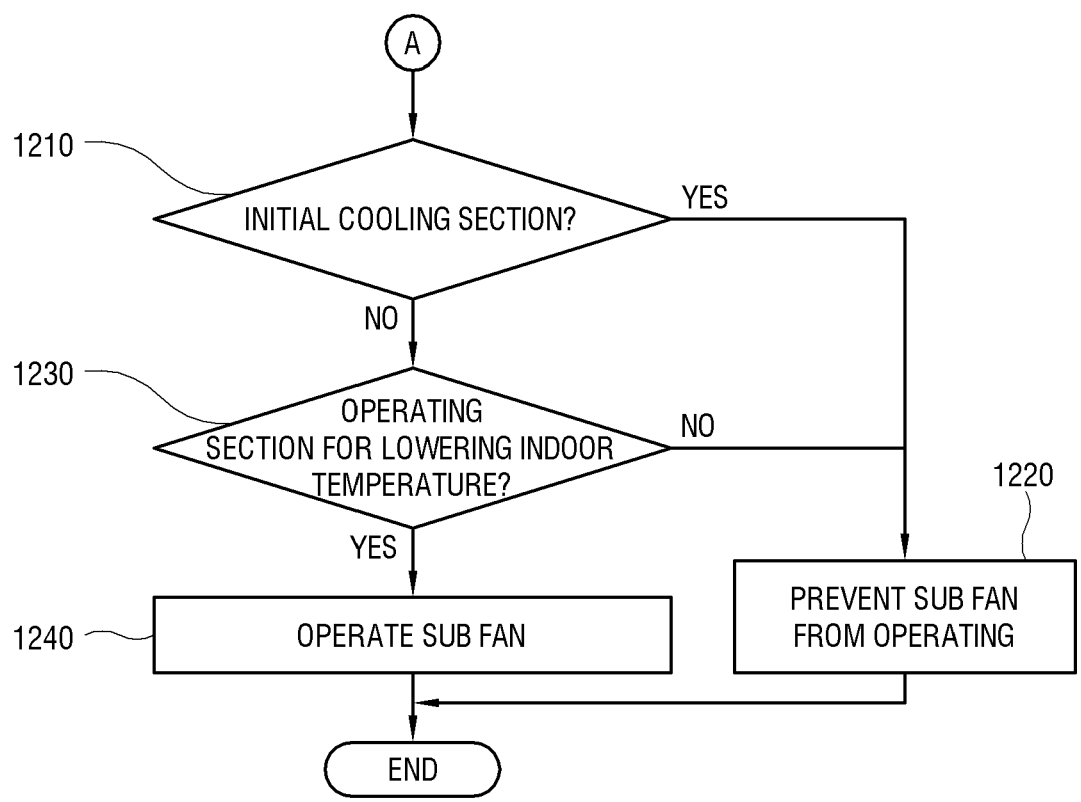

FIGS. 11 and 12 are flowcharts showing a method by which an indoor unit of an air cooler controls a sub fan to be driven according to an embodiment of the disclosure.

As shown in FIGS. 11 and 12, the following operations are performed by the processor of the indoor unit.

At operation 1110 the indoor unit operates as the system is powered on.

At operation 1120 the indoor unit obtains the indoor temperature and the outdoor temperature at the present point in time.

At operation 1130 the indoor unit performs a cooling process based on the setting temperature designated by a user. In this cooling process, the indoor unit drives the indoor heat exchanger and the main fan based on change in the indoor temperature.

At operation 1140 the indoor unit identifies whether a present load condition identified based on the indoor temperature and the outdoor temperature is the high load condition, while the cooling process is performed.

When it is identified that the present load condition is the high load condition, at operation 1150 the indoor unit identifies whether the present time section is an operating section for lowering the indoor temperature.

When it is identified that the present time section is the operating section for lowering the indoor temperature, at operation 1160 the indoor unit drives the sub fan. Here, the operating section for lowering the indoor temperature corresponds to the section A and the section C in the foregoing embodiment for the high load condition.

On the other hand, when it is identified that the present time section is an operating section not for lowering the indoor temperature, at operation 1170 the indoor unit does not operate the sub fan. Here, the operating section not for lowering the indoor temperature corresponds to the section B in the foregoing embodiment for the high load condition.

Meanwhile, when it is identified in the operation 1140 that the present load condition is not the high load condition, at operation 1210 the indoor unit identifies whether the present time section is the initial cooling section. Here, the initial cooling section corresponds to the section A in the foregoing embodiment for the low load condition.

When it is identified that the present time section is the initial cooling section, at operation 1220 the indoor unit does not operate the sub fan.

On the other hand, when it is identified that the present time section is not the initial cooling section, at operation 1230 the indoor unit identifies whether the present time section is an operating section for lowering the indoor temperature.

When it is identified that the present time section is the operating section for lowering the indoor temperature, at operation 1240 the indoor unit operates the sub fan. Here, the operating section for lowering the indoor temperature corresponds to the section C in the foregoing embodiment for the low load condition.

On the other hand, when the present time section is an operating section not for lowering the indoor temperature, the indoor unit returns to the operation 1220. Here, the operating section not for lowering the indoor temperature corresponds to the section B in the foregoing embodiment for the low load condition.

Thus, the indoor unit selectively operates the sub fan based on the high load condition or the low load condition during the cooling process.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

The invention claimed is:

1. An air conditioner comprising:
    a housing internally comprising a first channel and a second channel which are different in inlets and outlets and isolated from each other;
    a heat exchanger provided in the first channel and configured to exchange heat with air;
    a first fan provided in the first channel and configured to emit air, of which heat is exchanged with the heat exchanger, to an outside of the housing in an indoor space;
    a second fan provided in the second channel and configured to emit air, which moves along the second channel, to the outside of the housing;
    a driver configured to drive each of the first fan and the second fan; and
    a controller configured to control the driver to operate the first fan based on an indoor temperature and an outdoor temperature, and selectively operate the second fan based on a time section in which at least one of the indoor temperature or the outdoor temperature satisfies a preset temperature condition,
    wherein the preset temperature condition comprises a condition about whether the indoor temperature is higher than a first threshold or the outdoor temperature is higher than a second threshold,
    wherein the controller identifies whether the time section satisfying the preset temperature condition is a cooling section where the heat exchanger and the first fan operate for cooling, and
    operates the second fan based on the time section identified as the cooling section,
    wherein the controller identifies whether the time section dissatisfying the preset temperature condition is an initial cooling section, in which the heat exchanger initially operates, among the cooling sections, wherein the controller prevents the second fan from operating based on the time section identified as the initial cooling section but operates the second fan based on the time section identified as not the initial cooling section, and wherein the controller prevents the second fan from operating based on the time section dissatisfying the preset temperature condition and identified as not the cooling section.

2. The air conditioner according to claim 1, wherein the controller prevents the second fan from operating based on the time section satisfying the preset temperature condition and identified as not the cooling section.

3. The air conditioner according to claim 1, wherein the second fan is disposed below the first fan.

4. The air conditioner according to claim 1, further comprising a sensor configured to detect the indoor temperature or the outdoor temperature, wherein the controller obtains information about the indoor temperature or the outdoor temperature from the sensor.

5. A method of controlling an air conditioner, comprising:

driving a heat exchanger provided in a first channel to exchange heat with air of the first channel;

driving a first fan provided in the first channel based on an indoor temperature and an outdoor temperature to emit the heat-exchanged air of the first channel to an outside of a housing of the air conditioner in an indoor space; and selectively driving a second fan provided in a second channel different in an inlet and an outlet from the first channel and isolated from the first channel, based on a time section in which at least one of the indoor temperature or the outdoor temperature satisfies a preset temperature condition, wherein the preset temperature condition comprises a condition about whether the indoor temperature is higher than a first threshold or the outdoor temperature is higher than a second threshold, wherein the selectively driving the second fan comprises:

identifying whether the time section satisfying the preset temperature condition is a cooling section where the heat exchanger and the first fan operate for cooling, operating the second fan based on the time section identified as the cooling section, identifying whether the time section dissatisfying the preset temperature condition is an initial cooling section, in which the heat exchanger initially operates, among the cooling sections, preventing the second fan from operating based on the time section identified as the initial cooling section but operating the second fan based on the time section identified as not the initial cooling section, and preventing the second fan from operating based on the time section dissatisfying the preset temperature condition and identified as not the cooling section.

6. The method according to claim 5, further comprising:

preventing the second fan from operating based on the time section satisfying the preset temperature condition and identified as not the cooling section.

7. An air conditioner comprising:

a housing internally comprising a first channel and a second channel which are different in inlets and outlets and isolated from each other;

a heat exchanger provided in the first channel and configured to exchange heat with air;

a first fan provided in the first channel and configured to emit air, of which heat is exchanged with the heat exchanger, to an outside of the housing in an indoor space;

a second fan provided in the second channel and configured to emit air, which moves along the second channel, to the outside of the housing;

a driver configured to drive each of the first fan and the second fan; and a controller configured to control the driver to operate the first fan based on an indoor temperature and an outdoor temperature, and selectively operate the second fan based on a time section in which at least one of the indoor temperature or the outdoor temperature satisfies a preset temperature condition, wherein the outlet of the second channel is disposed above the second fan.

8. An air conditioner comprising:

a housing internally comprising a first channel and a second channel which are different in inlets and outlets and isolated from each other;

a heat exchanger provided in the first channel and configured to exchange heat with air;

a first fan provided in the first channel and configured to emit air, of which heat is exchanged with the heat exchanger, to an outside of the housing in an indoor space;

a second fan provided in the second channel and configured to emit air, which moves along the second channel, to the outside of the housing;

a driver configured to drive each of the first fan and the second fan;

a controller configured to control the driver to operate the first fan based on an indoor temperature and an outdoor temperature, and selectively operate the second fan based on a time section in which at least one of the indoor temperature or the outdoor temperature satisfies a preset temperature condition; and a punching-hole plate coupled to the housing to cover the outlet of the first channel and comprising a plurality of punching holes to emit air, wherein the first fan is disposed between the heat exchanger and the punching-hole plate.

\* \* \* \* \*